(12) United States Patent
O'Connor

(10) Patent No.: US 6,409,349 B1
(45) Date of Patent: Jun. 25, 2002

(54) ENHANCING SPECTRAL LUMINOSITY IN PROJECTION DISPLAYS

(75) Inventor: Michael O'Connor, Cupertino, CA (US)

(73) Assignee: Intel Corporation, Santa Clara, CA (US)

( * ) Notice: Subject to any disclaimer, the term of this patent is extended or adjusted under 35 U.S.C. 154(b) by 26 days.

(21) Appl. No.: 09/728,854

(22) Filed: Dec. 1, 2000

(51) Int. Cl.[7] ............................................. G03B 21/14
(52) U.S. Cl. ........................................... 353/31; 353/94
(58) Field of Search ........................... 353/31, 33, 34, 353/37, 20, 94; 349/5, 8, 9

(56) References Cited

U.S. PATENT DOCUMENTS

| | | | |
|---|---|---|---|
| 4,936,658 A | * 6/1990 | Tanaka et al. | 353/34 |
| 5,580,142 A | * 12/1996 | Kurematsu et al. | 353/31 |
| 5,971,545 A | * 10/1999 | Haitz | 353/31 |
| 6,183,092 B1 | * 2/2001 | Troyer | 353/31 |

* cited by examiner

*Primary Examiner*—William Dowling
(74) *Attorney, Agent, or Firm*—Trop, Pruner & Hu, P.C.

(57) ABSTRACT

A light source used for projection displays that produces more light of a particular color relative to one or more other colors can be operated in a way to increase the performance of the overall optical system. A first color component that is produced in a lesser amount, may be separated out from the light and discarded while the other light components may be modulated. A separate light source may generate light of the first color that is modulated and combined with the previously modulated color components.

18 Claims, 1 Drawing Sheet

ENHANCING SPECTRAL LUMINOSITY IN PROJECTION DISPLAYS

BACKGROUND

This invention relates generally to projection displays.

Many projection display systems are driven by ultra high pressure (UHP) mercury halide arc lamps. These arc lamps generate most of their light in the green portion of the spectrum and very little light in the red portion of the spectrum.

In order to produce display images that have color temperatures meeting various display standards, the projection systems discard a high percentage of the green light in order to achieve the right color balance between the green, blue and red components. This accommodation may decrease the brightness of the display, complicate projection system design and limit the size of the display that the arc lamp can power.

Thus, there is a need for better ways to utilize light sources that generate light with an imbalance between the color components.

DETAILED DESCRIPTION

Figure 1:
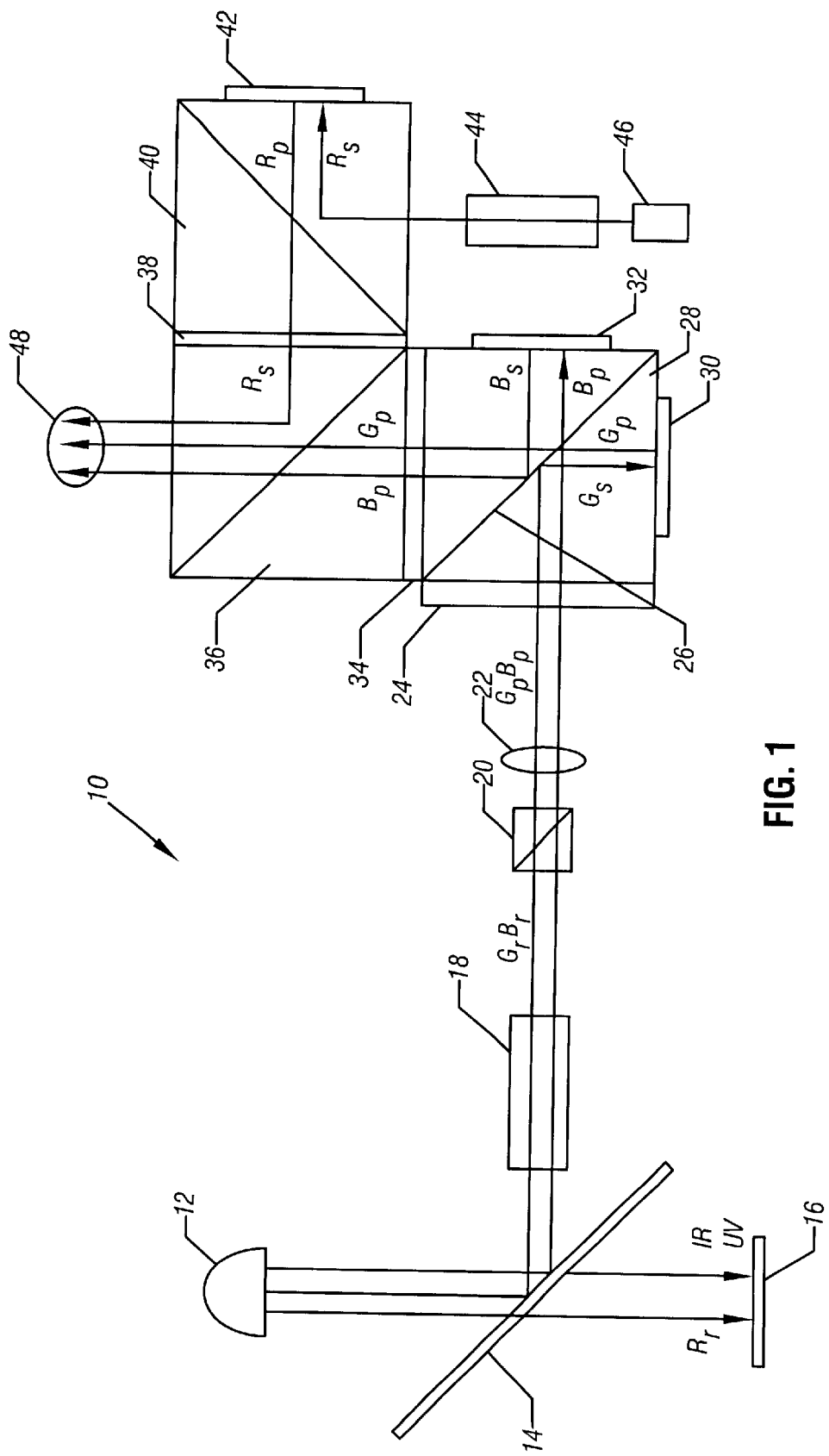
FIG. 1 is a schematic depiction of one embodiment of the present invention.

A light modulation engine 10 for a projection display includes a lamp 12 that produces more light in one portion of the spectrum than in another. For example, the lamp 12 may be an ultra high pressure mercury halide arc lamp that produces more light in the green portion of the spectrum and less light in the red portion of the spectrum.

The blue and green randomly polarized light ($B_r$, $G_r$) light generated by the lamp 12 is reflected from a cold mirror 14. The cold mirror 14 passes red ($R_r$), infrared (IR) and ultraviolet (UV) components that are collected by an absorber 16. The blue and green randomly polarized light ($G_r$, $B_r$) is reflected from the cold mirror 14 and is subjected to beam conditioning by the optics 18 to transform it into a uniform intensity beam with a shape matching the microdisplays 30, 32, 42.

The light ($G_r$, $B_r$) then interacts with a polarization converter 20 that reflects the s polarizations ($G_s$, $B_s$) and passes the p polarizations ($G_p$, $B_p$).

The blue and green ($G_p$, $B_p$) components are then passed through a lens 22 and input to a cyan notch dichroic filter 24 that removes a portion of the green spectrum that would be presented to both the blue and green spatial light modulators 30, 32. The blue and green ($G_p$, $B_p$) components are then input to a green polarization filter 26 that rotates the green component ($G_p$) to s polarization ($G_s$) while leaving the polarization of the blue component ($B_p$) unchanged. The blue and green light components ($G_s$, $B_p$) then transit a polarization beam splitter (PBS) 28 where, the green component ($G_s$) is reflected by the polarizer of the splitter 28 to image on the green spatial light modulator 30, and the blue component ($B_p$) passes through the polarizer of the splitter 28 to image on the blue spatial light modulator 32.

The green spatial light modulator 30 serves to rotate the polarization of the green light component ($G_s$) back to p polarization ($G_p$) for those pixels that are "on". The "on" green light component ($G_p$) then transits the PBS 28 passing through its polarizer, also passing through a Blue Twist polarization filter 34 unchanged, and through the combining PBS 36 to contribute to the final image 48.

The green spatial light modulator 30 also serves to leave the polarization of the green light component ($G_s$) that images to "off" pixels unchanged in the s polarization state ($G_s$). This "off" green light component ($G_s$) is reflected by the PBS 28 polarizer back toward the light source 12 and does not contribute to the final image.

The blue light component ($B_p$) that passes through the PBS 28 polarizer images on the blue spatial light modulator 32. The blue spatial light modulator 32 serves to rotate the polarization of the blue light component ($B_p$) to the s polarization ($B_s$) for those pixels that are "on". The "on" blue light component ($B_s$) then reflects from the polarizer in the PBS 28 and passes through a Blue Twist polarization filter 34, where its polarization is changed to p polarization ($B_p$). It then passes through the combining PBS 36 to contribute to the final image 48.

The blue spatial light modulator 32 also serves to leave the polarization of the blue light component ($B_p$) that images to "off" pixels unchanged in the p polarization state ($B_p$). This "off" blue light component ($B_p$) passes through the PBS 28 polarizer back toward the light source 12 and does not contribute to the final image 48.

A red light component ($R_s$) is introduced into a PBS 40 from a second light source 46 such as a red laser array or an arc lamp. The conditioning, despeckling and imaging optics 44 serve to put the red light component into the s polarization state if needed, and to prepare the light to match the f number of the imaging optics 22 used for the blue and green light components.

This red light component ($R_s$) reflects from the PBS 40 polarizer to image to the red spatial light modulator 42. The red spatial light modulator 42 serves to rotate the polarization of the red light component ($R_s$) back to p polarization ($R_p$) for those pixels that are "on". The "on" red light component ($R_p$) then transits the PBS 40 passing through its polarizer, also passing through a half wave achromatic phase retarder, which changes it back to the s polarization ($R_s$). It then enters the combining PBS 36 where it reflects from the PBS 36 polarizer combining with the "on" green and blue spatial light components to form the final image 48.

The red spatial light modulator 42 also serves to leave the polarization of the red light component ($R_s$) that images to "off" pixels unchanged in the s polarization state ($R_s$). This "off" red light component ($R_s$) is reflected by the PBS 28 polarizer back toward the light source 46 and does not contribute to the final image.

The combined light output 48 may then be displayed on a projection screen (not shown).

In embodiments of the present invention, the design of light modulation engine 10 may be simplified. In addition, the brightness standard display color temperatures may be increased in some embodiments. Much larger display screens may be driven by arc lamps used in projection systems in some cases. In addition, arc lamps may be re-optimized for luminance efficiency to a condition where they readily emit green and blue components, thus increasing their light output and lifetime. By making the light source 46 emit a red light with an étendue that matches that of the lamp 12 and light modulation engine 10, light from the two light sources may be effectively combined.

The light modulation engine 10 may dump red light from the lamp 12 in an early optical stage and may re-introduce red light from a second, high intensity source in a later optical stage. The red light (R) from the second, high intensity source 46 is imaged on the red spatial light modulator 42 and combined with modulated blue and green beams (GB).

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:
   receiving, from a light source, first light including first and second color components;
   removing the first color component from said first light;
   modulating the second color component;
   generating second light of the first color;
   modulating said second light; and
   combining said modulated second light and the modulated first light.

2. The method of claim 1 wherein receiving first light from a light source includes receiving first light from a light source which generates more light of said first color component than said second color component.

3. The method of claim 1 including receiving first light from a ultra high pressure mercury halide arc lamp.

4. The method of claim 1 further including discarding the first color component from said first light.

5. The method of claim 1 wherein generating second light of the first color includes operating a light source which generates red light.

6. The method of claim 1 wherein removing the first color component from said first light includes using a beam splitter that splits said first and second color components.

7. The method of claim 1 wherein generating the second light occurs in the optical sequence after modulating the second color component.

8. The method of claim 1 including receiving, from a light source, first light including first, second and third color components, modulating said second and third color components and combining said modulated second light and the modulated second and third colors.

9. A modulation engine comprising:
   a first light source that generates light including first and second color components;
   a beam splitter that splits the first color component from the second color component;
   a first modulator that modulates said second color component;
   a second light source that generates light of said first color;
   a second modulator that modulates said light from said second source; and
   a combiner that combines said modulated light from the first and second sources.

10. The engine of claim 9 wherein said first light source generates more light of said first color component than said second color component.

11. The engine of claim 9 wherein said first light source is a mercury halide arc lamp.

12. The engine of claim 9 wherein said second light source is a red laser source.

13. The engine of claim 9 wherein said first light source generates light including first, second and third color components.

14. The engine of claim 9 wherein said second light source generates primarily light of said first color.

15. The engine of claim 9 including an absorber that absorbs said first color component of said first light source.

16. A projection display comprising:
   a first light source that generates first light including first and second color components;
   a beam splitter that splits the first color component from the second color component of said first light;
   a first spatial light modulator that modulates light of the second color component of said first light;
   a second light source that generates second light of the first color component;
   a second spatial light modulator that modulates light of the first color component of the second light; and
   a device that combines said modulated lights of said first and second color components.

17. The display of claim 16, wherein said first color component is a red color component and said second color component is a blue or green color component.

18. The display of claim 16, wherein said first light source is a mercury halide lamp and said second light source is a red laser light source.

* * * * *